INVENTOR.
GEORGE L CARSON
BY Crosby Gauthier
his attorney

Patented Aug. 20, 1946

2,406,193

UNITED STATES PATENT OFFICE 2,406,193

ELECTRIC MOTOR

George Leslie Carson, Philadelphia, Pa., assignor, by mesne assignments, to Philco Corporation, Philadelphia, Pa., a corporation of Pennsylvania Application January 27, 1945, Serial No. 574,854

3 Claims. (Cl. 172—278)

This invention has to do with induction motors and has for its object to provide a motor of that character which is instantly reversible and of variable speed in both directions, and which is characterized by positive dynamic braking.

Motors in accordance with this invention are particularly advantageous where direction and speed must be constantly under quick control of the operator, as in the tuning of radio circuits, remote control of adjustments, focusing television cameras and rotating small radio and television antennas.

Figure 1:
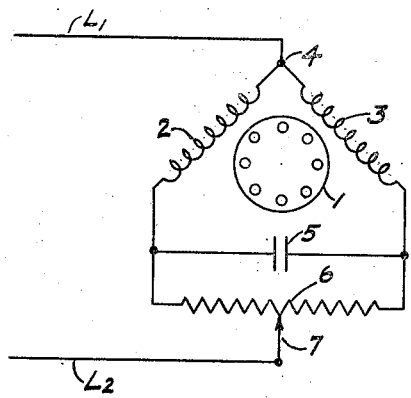
Figure 2:
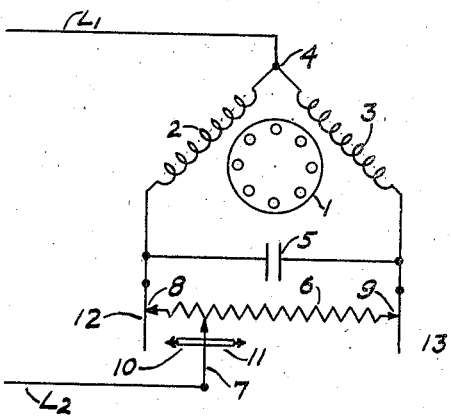
Figure 3:
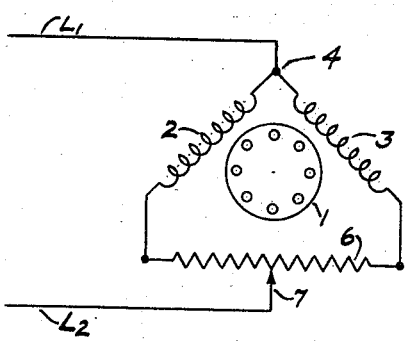

In the drawing, Figs. 1, 2, and 3 illustrate diagrammatically three different embodiments of the invention.

Referring first to Fig. 1, the motor there indicated comprises a squirrel cage rotor 1 and two field windings 2 and 3 respectively, which, as usual, are angularly spaced to produce a rotary field when the currents therethrough are suitably phase-displaced. A common terminal 4 is connected to one side of the line $L_1$. Across the other terminals of the two windings are connected in parallel a capacitor 5 and a potentiometer resistor 6.

The movable contactor 7 of the potentiometer is connected to the other side of the line $L_2$ and is shown in contact with the midpoint of resistor 6.

With contactor 7 in mid-position, as shown, the motor will not run. If, however, contactor 7 is moved to the right the motor will start in one direction and will gradually increase its speed as the contactor is moved farther to the right, and will attain maximum speed when the contactor has been moved all the way to the right.

If, on the other hand, contactor 7 is similarly moved toward the left from mid-position, the motor will run in the opposite direction and gradually increase its speed, as before.

If the contactor is moved toward mid-position the motor will gradually decrease its speed and, upon reaching mid-position, it will come to an abrupt stop without over-running. This is due to dynamic braking action and is a very important characteristic when the motor is employed for such purposes as those hereinbefore mentioned.

The invention as depicted in Fig. 1 has been incorporated in a small fractional horsepower motor. The windings were alike and of usual proportions. Capacitor 5 had a capacity of one microfarad and the resistor 6 had a value of 2500 ohms. With a capacitor 5 of one-half microfarad it was found that the top speed of the motor was a little less. It was also found that the motor performance was about the same when a potentiometer of 5000 ohms resistance was tried, instead of the aforementioned 2500 ohms. In each instance the load was exceedingly small. It may well be that where larger loads are to be driven the size of capacitor 5 and resistor 6 will be found to be more critical than my observations have so far indicated.

If resistor 6 is cut out and the motor operated as a conventional capacitor induction motor its speed will be higher than the top speed obtainable with the arrangement of Fig. 1; and since there may be instances where it is desirable to attain a higher top speed I have shown in Fig. 2 a modification of Fig. 1 by means of which the higher top speed can conveniently be realized. Here the two ends of resistor 6 are connected to the respective motor windings through contacts 8 and 9. Contactor 7 is equipped with a pair of conductive projections 10 and 11 which are designed, respectively, to engage contact springs 12 and 13 and thus break contact 8 or 9 when the contactor is moved all the way to the right or left, as the case may be. The circuit through the motor is thus established via contact spring 12, projection 10 and contact arm 7 or, alternatively, via contact spring 13, projection 11 and contact arm 7. In both cases the contact between contactor 7 and resistor 6 is broken immediately after opening contact 8 or 9.

I have further found that if capacitor 5 is omitted, as illustrated in Fig. 3, the continuously variable speed and reversing characteristics of the motor of Figs. 1 and 2 still obtain, but the dynamic braking characteristic is greatly diminished. In other words, a motor according to Fig. 3 will not come to an abrupt stop when contactor 7 reaches the mid-point of resistor 6, but will, instead, over-run. This is a bad feature if the motor is to be used for any of the purposes mentioned at the beginning of this specification; but if all that is needed is a motor that will run at continuously variable speeds in both directions, the arrangement of Fig. 3 will answer the purpose.

What is claimed is:

1. A reversible, variable speed induction motor comprising a rotor, a pair of field windings angularly displaced to produce a rotating field, said windings having one common terminal, a capacitor connected across the remaining terminals of said windings, and a potentiometer having its resistor element connected across said capacitor, said common terminal being adapted for connection to one side of the line and the moving contactor of said potentiometer being adapted for connection to the other side of the line.

2. A reversible variable speed induction motor comprising a rotor, a pair of field windings angularly displaced to produce a rotating field, said windings having one common terminal, a capacitor connected across the remaining terminals of said windings, a potentiometer having its resistor element connected across said capacitor, said common terminal being adapted for connection to one side of the line, the moving contactor of said potentiometer being adapted for connection to the other side of the line, and means for cutting said resistor element out of circuit when said contactor is moved to one extremity of its movement along said resistor, said means being further operative to connect one terminal of said capacitor to said other side of the line when said resistor element is cut out.

3. A reversible, variable speed induction motor comprising a rotor, a pair of field windings, angularly displaced to produce a rotating field, said windings having one common terminal, and a potentiometer having its resistor element connected across the remaining terminals of said windings, the moving contactor of said potentiometer being adapted for connection to one side of the line, said common terminal being adapted for connection to the other side of the line.

GEORGE LESLIE CARSON.